July 2, 1968 G. DAL MONTE ETAL 3,391,245
SMALL SIZE CALLING DIAL TO BE USED WITH HAND-HELD TELEPHONE SETS AND THE LIKE
Filed Feb. 18, 1965
Fig. 1
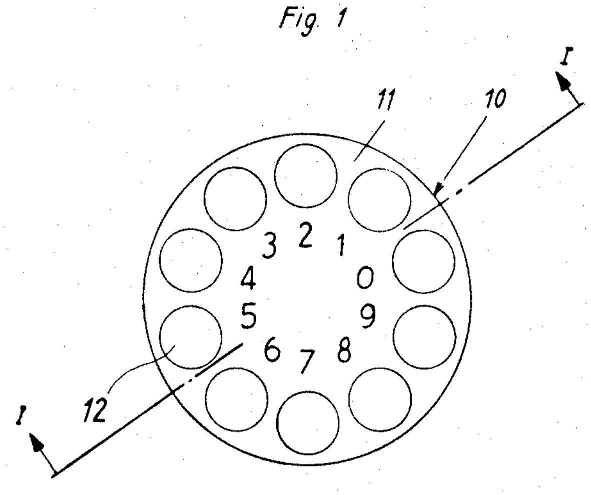
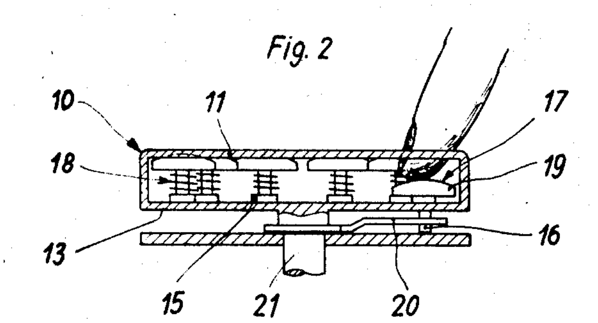
Fig. 3
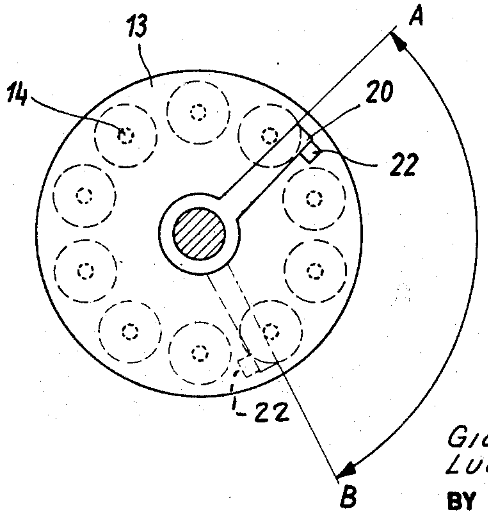
INVENTORS
GIORGIO DAL MONTE
LUCIANO CALLEGARI
BY Irwin S. Thompson
ATTORNEY United States Patent Office 3,391,245

Patented July 2, 1968

3,391,245

SMALL SIZE CALLING DIAL TO BE USED WITH HAND-HELD TELEPHONE SETS AND THE LIKE

Giorgio Dal Monte and Luciano Callegari, Milan, Italy, assignors to Società Italiana Telecommunicazioni Siemens S.p.A.

Filed Feb. 18, 1965, Ser. No. 433,664
3 Claims. (Cl. 179—90)

ABSTRACT OF THE DISCLOSURE

A miniaturized telephone calling dial has ten numbered holes closely and equidistantly spaced entirely about its periphery. A push button is disposed in each hole and can be depressed by the finger to extend a rod below the dial that engages an arm rotatable about the spindle of the dial for registering the dialed number. A detent on the underside of the dial engages and returns the arm to its rest position upon reverse rotation of the dial.

This invention relates to a compact calling dial to be used with telephone sets and the like, and more particularly pertains to a compact and miniaturized calling dial adapted to be used on hand-held telephone sets installed in the handle thereof.

In the telephone industry there is a public demand for telephone sets which are compact, attractive, and can be conveniently held in the operator's hand.

One type of conventional calling dial presently used employs eleven circumferential sectors, ten of which are equally spaced therebetween, each carrying a numbered hole, except one which is covered with a stop member for dial rotation. This stop member is placed below the plate carrying the holes and rotates about the same spindle through an angle of the same amount required to rotate the dial, for example, the amount required to rotate the calling dial for selecting digit 1 and for permitting free dial rotation. This dial has some important disadvantages, for example, if the diameter of the numbered holes is not changed, there is no possibility of reducing the whole dial diameter; and the conventional finger stop, being shaped as a hook with a point, is inconvenient during use and permits snagging of one's clothing thereon which may constitute a rejection by the customer for this type of hand-held set, and also can constitute a complication for clean, efficient and accurate operations thereof.

The present invention solves the above problems by providing a new miniaturized calling dial comprised of a minimum number of structural cooperating component parts uniquely arranged so that a movable contact stop link member cooperates with a stop on the hidden or underside of the dial mounted on a spindle shaft.

The movable contact stop member is an elongated bar member having a cooperating stop at one end to coact with the stop on the back side of the dial, and the other end of the movable stop member terminates in an apertured bearing wiping contact means adapted to receive the spindle shaft and revolve thereon juxtaposed to the underside of the dial in order that the stop on the underside of the dial may cooperate with the movable contact stop member when the dial automatically returns to its normal position by revolving counterclockwise after dialing each digit. The dial is divided into ten circumferential digit sectors having a numbered hole adapted to receive therein the operator's finger during operation or dialing thereof. Beneath each of said holes in the dial is reciprocably mounted a spring-biased pin, or nail, member comprised of an enlarged arcuate head portion, the central portion of which coacts with the underside of each of the above hole apertures in the dial when not being operated or depressed by the operator's finger. The other end of the pin member is suitably mounted in an apertured bearing means integrally communicating with the underside of the calling dial.

During operation, the movable contact stop member revolves about the dial shaft or spindle, at least through an angle which is required to rotate the dial clockwise for selecting digit 1, during engagement of the movable contact stop member with one of the pins being depressed by the operator's finger, after which the dial is released and returns by supporting shaft counterclockwise during which the stop on the underside of the dial engages the movable contact stop member, returning it to its original open or dead contact position about the dial shaft.

While the present invention is intended primarily for telephone use, it may be used as a digital input for computer devices, within the purview of the invention, as understood by those skilled in the art.

The primary object of this invention is to provide a miniaturized calling dial having a novel arrangement of parts comprising a dial which is efficient and attractive and of a smaller diameter than those in known present use, which maintains the same number of finger-actuated dialing holes in the circumferential diameter of the dial for each digit or letter, as desired, in which the outer surface of the dial has no finger stop extending therefrom, but having a concealed and efficient contact stop therefor extending from the lower surface of the dial for cooperation therewith which solves the above problems.

A further object of the invention is to provide a miniaturized calling dial for hand-held telephones in which the numerical digits are located substantially centrally of the dial adjacent each corresponding dial hole mounted in the outer peripheral portion of the dial.

Another object of the invention is to provide a digital input means for use with digital computers.

A still further object of the invention is to provide a miniaturized calling dial in which the dial comprises a plurality of sequenced manually movable stops therefor.

With the above and other objects in view, the invention has particular relation to certain novel features of construction, arrangement of parts and use, examples of which are given in this specification and illustrated in the acompanying drawing, wherein:

FIGURE 1 is a plan view of a preferred embodiment of a calling dial according to the invention;

FIGURE 2 is a transverse sectional view of the dial of FIG. 1, taken substantially along line I—I, looking in the direction of the arrows; and FIGURE 3 is a plan view taken substantially under the cylindrical body containing a plurality of movable stop members, showing the coacting movable contact stop member shown in solid lines for its normal position when not being operated, and shown in broken lines in its extreme radial position during operation before its return by the dial to its solid line position.

In the drawing, like reference numerals represent like parts therein.

Referring to FIGS. 1–3, the exemplary embodiment of the illustrated calling dial consists essentially of a cylindrical hollow body 10, whose top base 11 is divided into ten sectors, each carrying centrally numbered holes, as 12, with a diameter identical to that provided in a usual standard dial type. The bottom base 13 of the cylindrical body 10 carries ten pin apertures 14, distributed around a circumference of the dial, having their axes coincident with the axes of the corresponding numbered holes of the dial. Each opening 14 is surrounded by a sleeve 15 integral with the cylindrical body 10, in which reciprocates or slides the rod 16 of a button 17. Buttons 17 when not depressed are positioned free of movable contact member 20 by a spring means 18, contained also in spaced relationship between bases 11 and 13, having head portion 19 of button 17 pressed against the lower edge of the corresponding numbered hole closing it in top base 11. FIG. 3 shows the movable contact stop member 20 which rotates about the spindle 21 of calling dial 10, and which moves from its normal upper open or dead contact point A to its lower open or dead contact point B through an angle including digit 1 operation and a time period corresponding to two additional current interruptions. For the sake of understanding, in FIG. 3, are shown the two end positions of the movable contact stop member 20, and, represented in broken lines, the ten rods 16 which rotate member 20.

Naturally, the same calling dial of the present invention can be used also when an additional time period is required between two successive series of current impulses.

In operation, the subscriber who initiates a call inserts the finger through hole 12 in the top of dial 10, representing the wanted number as indicated by central numerical indicia on dial 10. In this example, we assume digit 3, and the operator exerting a force by the finger against the head 19 in opposition to spring 18 making rod 16 of button 17 slidable inside bearing sleeve 15. With the finger placed in the hole, the dial is rotated by the operator until rod 16 is engaged with and moves the movable contact stop member 20 from its normal upper open contact point or dead point A to its lower open contact point or dead point B. After that, the operator releases dial 10 which freely returns by shaft 21 to the starting position A by detent 22 protruding from the rear base of cylinder 10, in intermediate position between holes 0 and 1, automatically carrying back the movable contact stop member 20 to its upper dead contact point A. In FIG. 3, the dashed positions of detent 22 and movable stop member 20 show the position of detent 22 when it initially engages contact stop member 20 during its return movement from position B to position A, as best shown in FIG. 3. When another digit is selected, the above steps are repeated until a complete telephone number is called or dialed.

When digit 1 is selected, by pressing head 19 of button 17 through hole 1, rod 16 of button 17 comes tangent to coact with movable stop member 20; therefore, contact stop member 20 is immediately rotated clockwise by means of dial 10 and rod 16 from its original position A to position B during the dialing operation.

For clarity, the hand-held dialing phone set and all wiring and electrical connections thereto are omitted, as the contact interrelations of dial 10, movable contact stop member 20, and shaft 21 are understood by those skilled in the art.

As many embodiments may be made of the preferred embodiment hereinbefore shown and described, as desired, by those skilled in the art, without departing from this inventive concept, it being understood that all matter herein is to be interpreted merely as illustrative, and not in a limiting sense, except as set forth in the following appended claims.

Having described our invention, we claim:

1. A miniaturized calling dial comprising in combination a rotating body of a substantially cylindrical shape provided with a plurality of numbered holes uniformly distributed entirely about the periphery of its upper side, a button disposed in each hole coaxially with the hole to be pressed by the finger during the selection of a corresponding digit, a spindle on which the rotating body is mounted for rotation, and a stop device beneath the rotating body and mounted on said spindle for rotation relative to the rotating body, said stop device having an arm that extends radially outwardly but does not project beyond the periphery of the rotating body, said arm being positioned to be engaged by the depressed rod during rotation of the rotating body.

2. A calling dial as claimed in claim 1, said holes being ten in number.

3. A calling dial as claimed in claim 1, and a detent on the underside of said rotating body that engages and returns said arm and stop device to its initial position upon return rotation of the rotating body.

References Cited

UNITED STATES PATENTS

| | | | |
|---|---|---|---|
| 3,105,122 | 9/1963 | Babb et al. | 179—90 |
| 3,108,159 | 10/1963 | Mattke | 179—90 |

FOREIGN PATENTS

| | | |
|---|---|---|
| 1,107,288 | 5/1961 | Germany. |

KATHLEEN H. CLAFFY, *Primary Examiner.*

WILLIAM C. COOPER, *Examiner.*

A. H. GESS, *Assistant Examiner.*